(12) United States Patent
Montgomery

(10) Patent No.: US 7,513,055 B2
(45) Date of Patent: Apr. 7, 2009

(54) SLOPE LEVEL

(76) Inventor: Matthew C. Montgomery, 5524 Dutton Ave., Unit C3 and C2, North Charleston, SC (US) 29406

( * ) Notice: Subject to any disclaimer, the term of this patent is extended or adjusted under 35 U.S.C. 154(b) by 0 days.

(21) Appl. No.: 11/744,260

(22) Filed: May 4, 2007

(65) Prior Publication Data

US 2007/0220765 A1    Sep. 27, 2007

Related U.S. Application Data

(63) Continuation-in-part of application No. 11/280,963, filed on Nov. 16, 2005, now Pat. No. 7,340,841.

(51) Int. Cl.
*G01C 9/24* (2006.01)
(52) U.S. Cl. .......................................... 33/451
(58) Field of Classification Search ............... 33/451, 33/365, 381, 374, 379, 389, 521
See application file for complete search history.

(56) References Cited

U.S. PATENT DOCUMENTS

| | | | |
|---|---|---|---|
| 363,998 A | 5/1887 | Evelyn | |
| 375,222 A | 12/1887 | John | |
| 653,446 A | 7/1900 | Gohl | |
| 666,190 A | 1/1901 | Fontanella | |
| 685,569 A * | 10/1901 | Bullard | ........................ 33/365 |
| 756,628 A | 4/1904 | Happle | |
| 764,556 A | 7/1904 | Cable | |
| 883,659 A * | 3/1908 | Mahoney | ..................... 33/389 |
| 885,076 A | 4/1908 | Olson | |
| 917,699 A | 4/1909 | Wyatt | |
| 1,101,319 A | 6/1914 | Neff | |
| 1,630,172 A | 5/1927 | Custer | |
| 1,709,227 A | 4/1929 | Norgaard | |
| 1,820,365 A * | 8/1931 | Ries et al. | ..................... 33/381 |
| 2,384,453 A | 9/1945 | Chaney | |
| 2,566,542 A | 9/1951 | Vaida | |

(Continued)

FOREIGN PATENT DOCUMENTS

DE    102005055760 A1 *   6/2006

(Continued)

OTHER PUBLICATIONS

International Search Report in U.S. Appl. No. 11/280,963 mailed Oct. 24, 2007—5 pages.

(Continued)

*Primary Examiner*—Christopher W Fulton
(74) *Attorney, Agent, or Firm*—Dority & Manning, P.A.

(57) ABSTRACT

A slope level for measuring the slope of a surface is provided. The slope level includes a body having a front face and a back face and defining a first planar measurement surface. A transparent arced tube is disposed in an opening in the body. An aperture in at least one side of the level frame can allow for viewing of an arced tube through a clear cover protecting the tube. The clear cover may comprise a plastic material positioned between the side of the frame and filler material inside the frame and defining the groove, with the portion of the clear cover at the aperture extending outward so that the clear cover is flush with the side of the frame.

14 Claims, 8 Drawing Sheets

U.S. PATENT DOCUMENTS

| | | | |
|---|---|---|---|
| 2,948,067 A | | 8/1960 | Mistretta |
| 3,028,679 A | | 4/1962 | Christy |
| 3,243,888 A | | 4/1966 | Redding |
| 4,003,134 A | | 1/1977 | Adams |
| 4,534,117 A | * | 8/1985 | Haefner et al. ................. 33/379 |
| 4,989,334 A | | 2/1991 | DuBose, Jr. |
| 5,075,978 A | * | 12/1991 | Crowe ....................... 33/348.2 |
| 5,146,688 A | | 9/1992 | Ito |
| 5,567,606 A | * | 10/1996 | Hayashi et al. ............. 435/106 |
| 5,604,987 A | | 2/1997 | Cupp |
| 5,704,130 A | | 1/1998 | Augustin |
| 5,772,042 A | * | 6/1998 | Nott et al. ................... 209/166 |
| 6,748,666 B2 | * | 6/2004 | Zugel et al. .................... 33/451 |
| 6,779,276 B1 | | 8/2004 | Turner |
| 6,874,240 B1 | | 4/2005 | Cruttenden |
| 7,055,254 B1 | | 6/2006 | Fabian |
| 7,340,841 B2 | * | 3/2008 | Montogmery ................ 33/451 |

FOREIGN PATENT DOCUMENTS

KR  10-2003-026017  3/2003

OTHER PUBLICATIONS

International Search Report for PCT/US2008/06218, mailed Oct. 14, 2008-10 pages.

* cited by examiner

SLOPE LEVEL

PRIORITY CLAIM

This application claims the benefit of priority as a continuation-in-part application of previously filed U.S. Utility Patent Application entitled "SLOPE LEVEL," filed Nov. 16, 2005 and assigned U.S. Ser. No. 11/280,963 which is incorporated by reference herein in its entirety for all purposes.

BACKGROUND OF THE INVENTION

In construction, determining the slope of a surface is an important skill in ensuring that the apparatus, item or structure being built is meeting proper specifications. For example, builders and carpenters often have to determine the slopes of surfaces for constructing houses, installing flooring, or the like. If a surface that is supposed to be sloped does not meet the specification set forth, then the structure may not meet proper codes and can lead to faulty construction. For example, determining the pitch of a roof is crucial in determining the shape and size of the roof as well as the amount of material to be used.

Currently, expensive digital slope measuring devices are on the market that provide accurate measurements for the slopes of surfaces. However, these devices require a certain knowledge base to use and also can be expensive to acquire, maintain, and operate. Other less expensive mechanical devices exist. However, they are cumbersome to use and require multiple moving parts. For example, a plumb line can be difficult to use for a builder who is balancing on a support structure of a roof of a building.

Therefore, a need exists for a simple mechanical device which can determine the slope of a surface with relative ease, while communicating to the user the slope of the surface in a simple manner.

SUMMARY OF THE INVENTION

According to certain aspects of the present subject matter, a slope level is provided for measuring the slope of a surface. The slope level includes a body having a top side and a bottom side. The body can have any suitable shape, and has a front face and a back face disposed between the top side and the bottom side. The bottom side defines a first planar measurement surface. A transparent arced tube is disposed on the body. The arced tube has a first end and a second end and defines a pinnacle point between the first end and the second end. The first and second ends of the arced tube are in closer proximity to the first planar measurement surface than the pinnacle point. The arced tube defines an inner space containing a liquid therein with the arced tube also having a bubble of gaseous fluid disposed in the inner space within the liquid. A template is positioned proximal to the arced tube. The template includes measurement indicia disposed thereon to indicate the measurement of the slope.

According to further aspects of the present subject matter, a slope level for measuring the slope of a surface is provided. The slope level includes an elongated body having a top side and a bottom side. The body has a length great enough to neutralize minor variations of slope on the surface being measured. Further, the body has a front face and a back face disposed between the top side and the bottom side. The bottom side defines a first planar measurement surface. At least one transparent arced tube is disposed on the body. The arced tube has a first end and a second end and defines a pinnacle point between the first end and the second end. The arced tube also defines an inner space having a slope indicator disposed therein. The slope indicator is movable within the inner space. A template is positioned proximal to the arced tube. The template includes measurement indicia disposed thereon to indicate the measurement of the slope based on the position of the slope indicator within the inner space of the arced tube.

In some embodiments, a slope level can comprise at least one transparent arced tube, the tube defining an inner space containing a liquid therein and a bubble of gaseous fluid disposed in the inner space within the liquid and a frame. The frame can comprise a top side and a bottom side, the bottom side defining a first planar measurement surface. The frame may further comprise a front face and a back face disposed between the top side and the bottom side. The frame may include one or more apertures in the frame at the front face and/or the back face. The apertures may correspond to the arced tube. For instance, the apertures may be shaped so that some or all of the arced tube is visible through the aperture(s). The frame may comprise any suitable material, may be formed in any shape, and may be formed from a single component or multiple components.

The level can comprise one or more fill members positioned between the front face and the back face of the frame, with the fill member forming a groove shaped to accommodate the arced tube. The groove in the fill members may further be fully or partially open at one or more sides to allow for viewing of the arced tube from at least the front face or the back face through the corresponding aperture or apertures in the frame.

The level can further comprise one or more clear covers comprising transparent material positioned between the fill member and a side of frame comprising an aperture. The clear cover(s) can be configured to extend across the aperture to protect the arced tube.

The arced tube can have a first end and a second end and define a pinnacle point between the first end and the second end, with the first and second ends of the arced tube are in closer proximity to the first planar measurement surface than the pinnacle point.

In some embodiments, the frame comprises at least one aperture in the front face and the back face corresponding to the arced tube so that the tube is visible from both the front face and the back face of the level. In some embodiments, one or more of the clear covers can extend outward to fill the aperture in the frame so that the exterior of the clear cover is substantially flush with a face of the frame at the aperture.

In some embodiments, the liquid comprises a potassium salt, such as a solution comprising potassium formate. For instance, the liquid may comprise a solution comprising potassium formate and water at a percentage concentration between about ten percent and about seventy percent.

The arced tube can comprise a sealed glass tube, and the glass may filter UV (ultraviolet) radiation. In some embodiments, the level can comprise an end cap at one or both ends of the arced tube, with each end cap comprising a pliable material configured to cushion the ends of the arced tube. For instance, the pliable material may comprise rubber, silicone, and in some embodiments may be transparent.

The level may comprise one or more measurement templates, for instance, a plurality of indicia formed on the portion of the clear cover corresponding to an aperture. In some embodiments, the plurality of indicia are formed on the side of the clear cover facing the arced tube. For example, degrees or pitch indications may be formed on the clear cover so that the indications are visible while the tube (and bubble position) are viewed through the cover.

BRIEF DESCRIPTION OF THE DRAWINGS

A full and enabling disclosure of the present subject matter including the best mode thereof directed to one of ordinary skill in the art is set forth more particularly in the remainder of the specification, including references to the accompanying figures in which.

DETAILED DESCRIPTION

Reference will now be made in detail to the presently preferred embodiments of the invention, one or more examples of which are shown in the Figures. Each example is provided to explain the invention and not as a limitation of the invention. In fact, features illustrated or described as part of one embodiment can be used with another embodiment to yield still a further embodiment. It is intended that the present subject matter cover such alternative combinations, modifications and variations.

"Slope level" as defined herein means an instrument that is placed upon a surface to determine the angle or pitch of a slope of that surface.

"Horizontal ground axis" is defined herein as a theoretical horizontal axis that is a tangent to the surface of the earth, and thus generally corresponding to the generic ground surface thereof.

"Arced tube" is defined herein as having the walls of the tube curved in generally the same direction. For example, the arced tube may have walls that are substantially parallel to the outer circumference of radius of curvature of the arced tube.

Figure 1:
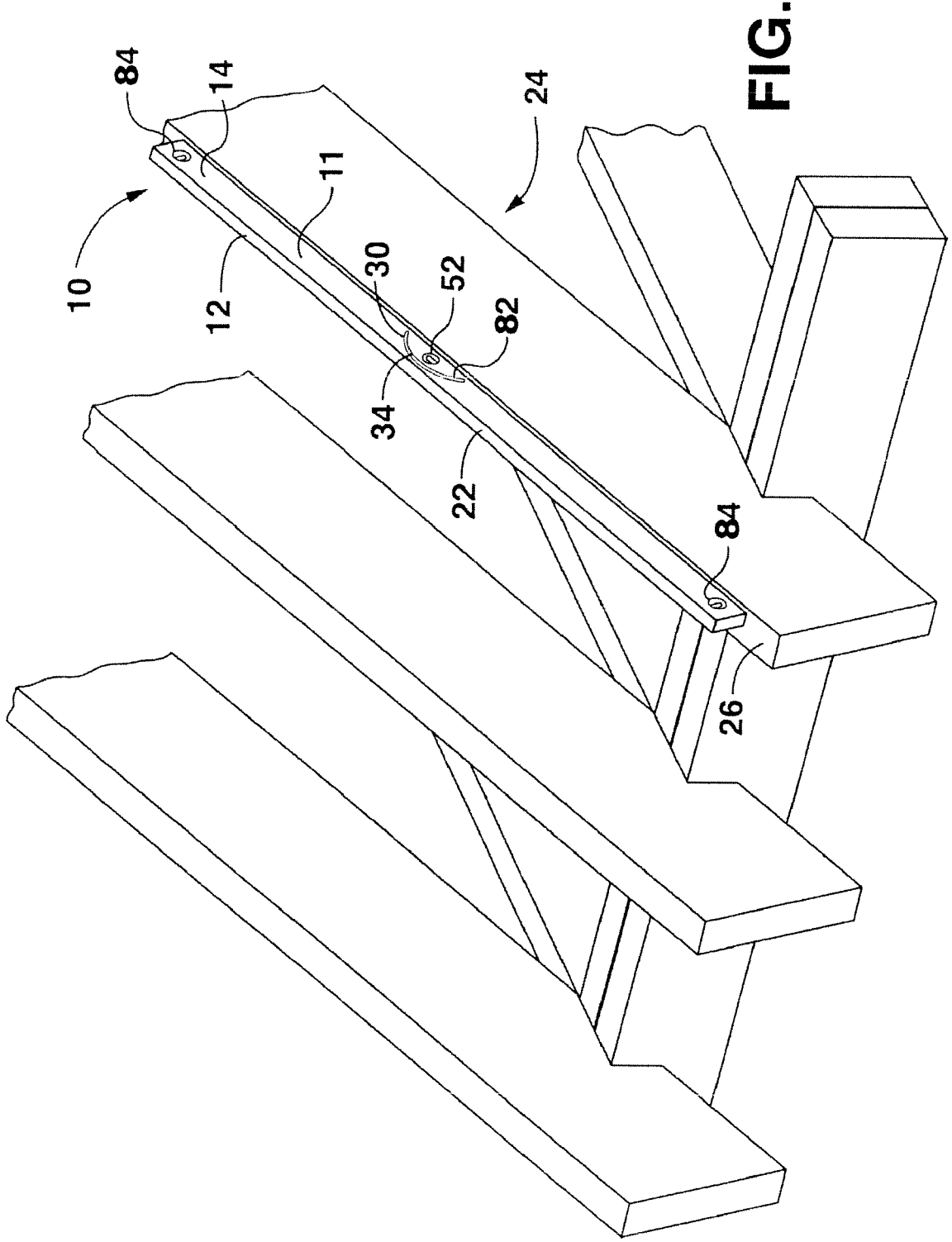
FIG. 1 illustrates a perspective view of an embodiment of a slope level according to the present subject matter.

FIG. 1 illustrates a slope level, generally 10, in use on a roof support structure 24. The slope level 10 is used to determine the angle or pitch of a slope of a surface relative to a horizontal ground axis. The slope level 10 includes a body 11 with a slope measuring device 30 embedded within the body 11. The body 11 of the slope level 10 may have a front face 14 and a back face (not shown). The back face may be identical or similar to the front face, as illustrated, or may provide different slope measuring devices as will be described below. The body may be constructed from metal, wood, plastic, a composite material or a combination thereof. For example, the body may include a metal I-beam with a composite material disposed between the wings of the I-beam. As another example, the body may include a box or other frame with a filler material disposed inside the body, with an aperture such as a groove through at least one side of the body with the slope measuring device therein.

The slope measuring device 30 may be viewed from the front face 14 or the back face or both the front and back faces. The slope level 10 includes a slope measuring device 30 that will indicate the angle of the slope or the pitch of the slope of the surface on which the slope level 10 is placed. For example, the slope level 10 is placed upon a surface 26 of a roof support structure 24 to determine the slope of the surface.

The slope measuring device 30 includes a transparent arced tube 32 and a slope indicator 34 which resides in the arced tube 32. In the embodiment shown in FIG. 1, the slope indicator 34 is a gaseous fluid-filled bead which resides in a liquid within an inner space of the arced tube 32. The gaseous fluid-filled bead that comprises the slope indicator 34 is less dense than the liquid within the inner space of the arced tube 32. When the slope level 10 is placed upon the surface 26 in the manner shown in FIG. 1, the slope indicator 34 floats on the liquid within the arced tube 32 along an outer wall of the arced tube 32 to a point of equilibrium. The point of equilibrium on the slope indicator 34 indicates the angle of the surface on which the slope level 10 resides relative to the horizontal ground axis. The body 11 of the slope level 10 may also include horizontal and vertical levels 82, 84. The horizontal level 82 determines the horizontal condition of the surface on which the slope level is placed, while vertical levels 84 can be used to determine the vertical condition of such surfaces. In particular, the horizontal level 82 may be used to determine if the surface on which the slope level 10 is placed is level in a horizontal direction. The vertical levels 84 may be used by placing the slope level 10 on a surface to determine if that surface is level in a vertical direction. Conventional spirit levels may be used as the horizontal level 82 and the vertical levels 84.

Figure 2:
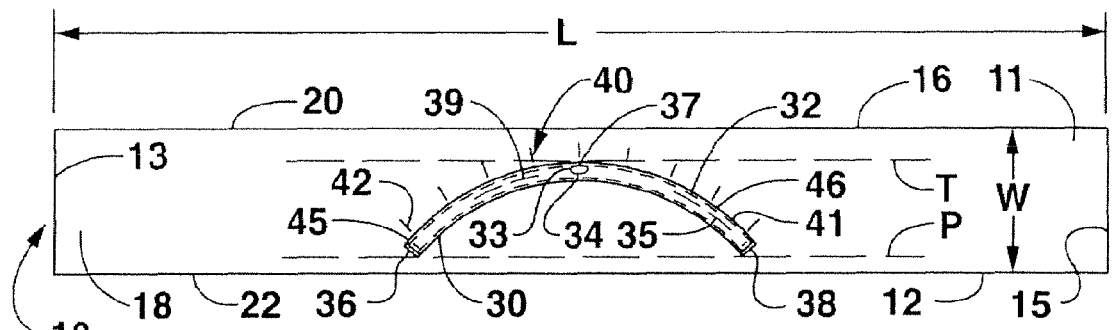
FIG. 2 illustrates a back view of an embodiment of a slope level according to the present subject matter.

FIG. 2 illustrates another embodiment of a slope level 10. The slope level 10 includes a body 11 with a measuring device 30 embedded in a back face 18 of the body 11. In such an embodiment, a second measuring device may be placed on the front face (not shown) of the body 11. The measuring device 30 includes a transparent arced tube 32 having a first end 36 and a second end 38. The arced tube 32 defines an inner space 39 in which a liquid 35 resides. A slope indicator 34 that comprises a bubble of gaseous fluid 33 resides within the liquid 35 of the slope measuring device 30. In the embodiment shown, a template 40 comprising measurement indicia 42 is marked on the body 11 along an outer edge 41 of the arced tube 32. The bubble of gaseous fluid 33 rises along an inner portion of the wall that defines the outer edge 41 of the arced tube 32.

The measurement indicia 42 of the template 40 may be used to indicate the slope in degrees or pitch. The pitch measurements are commonly used measurements for carpenters and builders. Pitch is defined by a unit of rise for every 12 units of horizontal length. For example, if over a 12 inch horizontal length, a slope rises 1 inch, then the pitch for this surface would be equal to 1. Similarly, if over a 12 inch horizontal length, a slope rises 6 inches then the pitch would be equal to 6.

The placement of the measurement indicia 42 along the outer edge 41 of the arced tube 32 corresponds to the positioning of the slope indicator 34 when the body 11 is placed at specific angles relative to a ground position. Each indicator 42 reflects the angle at which the body 11 is positioned relative to the horizontal ground axis when the slope indicator is below that specific measurement indicator 42. The measurement indicia 42 of the template 40 may be marked or engraved on the body 11 of the slope level 10. Alternatively, the template 40 may be a sticker placed along the outer edge 41 of the arced tube 32. The measurement indicia 42 may be marked on the sticker. In other embodiments, the template may be on or behind the arced tube 32.

The body 11 of the slope level 10 has a top side 12 and a bottom side 16 with the top side 12 having a planar measurement surface 22 and the bottom side 16 having a planar measurement surface 20. In the embodiment shown in FIG. 2, a second slope measuring device may reside on the front face (not shown) on the opposite wall from back face 18. The slope measuring device on the front face may be inverted as compared to the slope measuring device 30 on the back face 18. In this manner, when the planar measurement surface 20 is placed on a surface to be measured, the slope measuring device on the front face can be used to indicate the measurement of the slope of the surface. In contrast, when the planar measurement surface 22 is placed upon a surface to be measured, the slope measuring device 30 on the back face 18 will indicate the slope of that surface. In this manner, both the top side 12 and the bottom side 16 of the body 11 may be used as a planar measurement surface thereby increasing the versatility of the slope level 10.

In such an embodiment, one slope measuring device on one face may include a template of the measurement indicia representing degrees, while a template on the slope measuring device on the other face may have measuring indicia that represent pitch. In this manner, the slope level can give measurements of a slope in two different measurement metrics that are both useful to carpenters and builders.

In other embodiments, slope measuring device may have the same orientation on the front face and the back face so as to permit measurements based off the same planar measurement surface. For example, slope measuring device 30 may be positioned on the back face 18 and the front face so as to take measurements when the top side 12 with its planar measurement surface 22 is placed upon a surface to be measured. Again, with such embodiments, the measurement indicia 42 for the templates 40 may measure angles in degrees or pitch. Alternatively, one slope measuring device may have measuring indicia that measure angles in degrees on one face, while the measuring indicia of the template of the slope measuring device on the other face may measure pitch. In the embodiment shown in FIG. 2, the ends 36, 38 of the arced tube 32 are positioned along the same plane P that runs parallel to the planar measurement surface 22. The arced tube 32 has a pinnacle point 37 that is positioned halfway between the first end 36 and the second end 38. The pinnacle point 37 is located at a point on the arced tube 32 where a tangential plane T of the arced tube 32 runs parallel to the planar measurement surface 22. In the shown embodiment, the first and second ends 36, 38 are closer in proximity to the planar measurement surface 22 than the pinnacle point 37. When the slope indicator 34 resides at the pinnacle point 37, then the measurement planar surface 22 resides on a surface which has no slope and the tangential plane T is parallel with the horizontal ground axis. The measurement indicator 42 at the pinnacle point 37 would read zero ("0") for both pitch and degrees since the surface being measured has no slope. The portion of the arced tube 32 on either side of the pinnacle point 37 can be used to measure the slope depending on the orientations of the surface and the slope level 10. The measurement indicia 42 on the left side 45 of the arced tube 32 would indicate a downward slope of the surface being measured (as measured from left to right) with the left side 13 of the body 11 being in a higher position than the right side 15 of the body 11. Alternatively, the measurement indicia 42 on the right side 46 of the arced tube 32 would indicate an upward slope of the surface being measured with the left side 13 being in a lower position than the right side 15 of the body 11. Since the first end 36 and the second end 38 are positioned at equal distances from the pinnacle point 37 along a plane P that is parallel to the tangential plane T, an equal number of measurement indicia 42 may be placed on either side of the pinnacle point 37. In this manner, angles of a downward slope or an upward slope may be measured to the same degree in such an embodiment without having to flip the body 11 of the slope level 10 around. However, such equal measurement indicia or equal lengths of the arced tube 32 on either side of the pinnacle point 37 are not required.

The body 11 has a length L that is long enough to provide an adequate planar measurement surface 20, 22 to provide an adequate base for measuring the slope of the surface that is being measured. The length L should be great enough to neutralize minor variations of slope on the surface being measured. In other words, the length L should also be long enough to minimize the effects of minor variations on the surface of the structure being measured. For example, a rough surface may have undulations within the surface that would create erroneous readings of the slope for a slope level having an inadequate length. In certain embodiments, the length L of the body 11 may be between about 1 and about 5 feet. For example, the length may be 4 feet. For certain uses, other embodiments may employ a smaller length such as for laying tile flooring. The body 11 of the slope level 10 also has a width W. The width W should be such so as to accommodate the arced tube 32 within at least one of the front or back face 14, 18 of the body 11. The size of the arced tube 32 will depend on the range of angles or pitch to be measured by the slope measuring device and the radius of curvature of the arced tube 32. The length and width of the body 11 of the slope level 10 should be such that the slope level 10 is easy to use in various locations and accurate measurements of the slope may be taken.

Figure 3A:
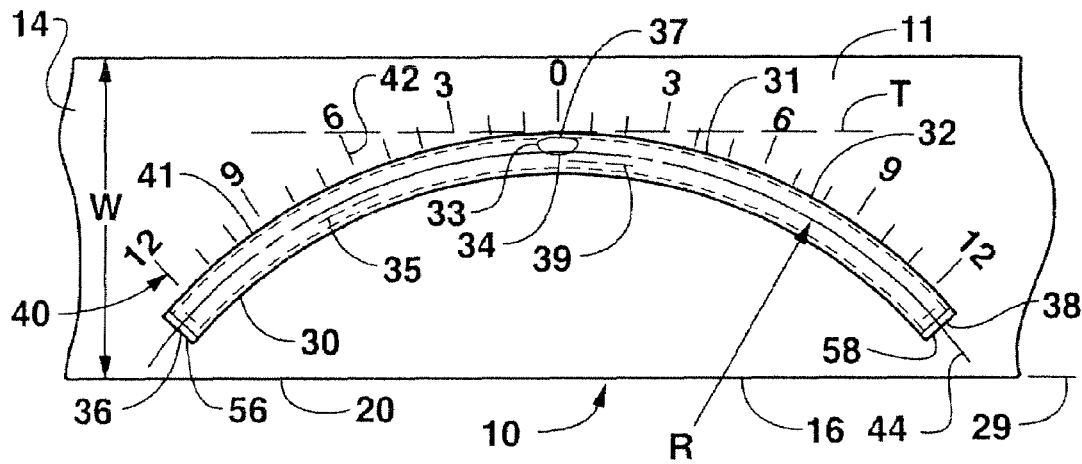
FIG. 3A illustrates a partial front view of a further embodiment of a slope level according to the present subject matter that is residing on a level surface.
Figure 3B:
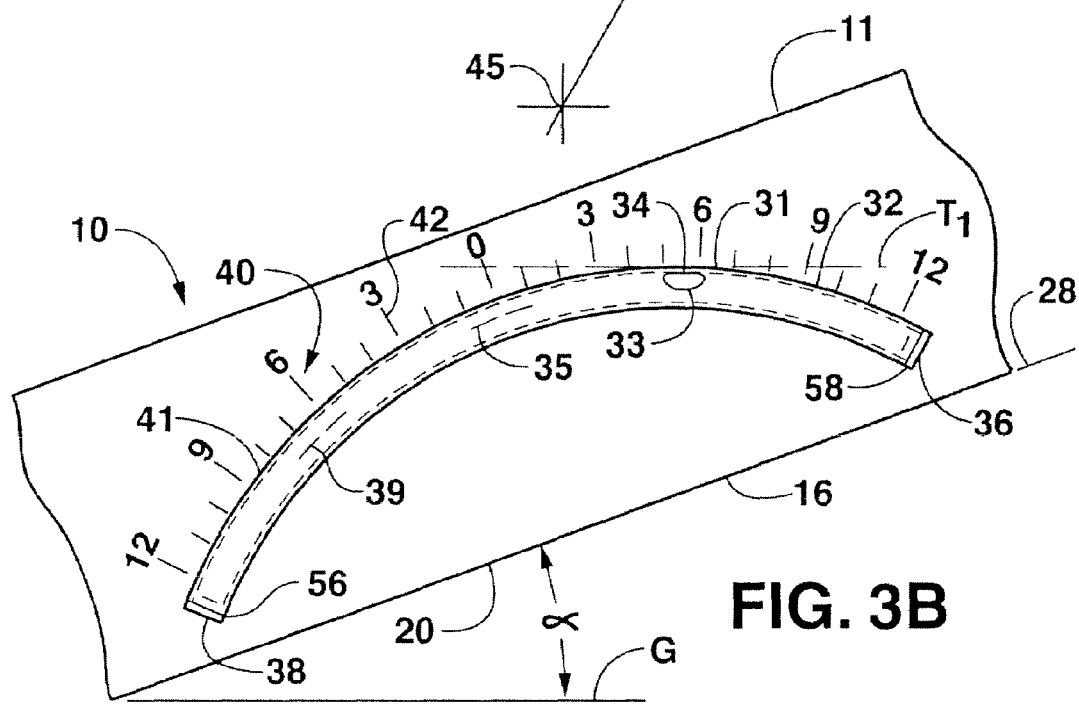
FIG. 3B illustrates a partial front view of the embodiment of the slope level depicted in FIG. 3A residing on a slope surface.

FIGS. 3A and 3B illustrate a portion of slope level 10 that includes a body 11 and a slope measuring device 30. FIG. 3A shows the slope level 10 on a surface 29 having zero ("0") slope. FIG. 3B shows the slope level 10 on a surface having a slope at an angle α. The slope measuring device 30 includes an arced tube 32 having a wall 31. The wall 31 may be constructed of one single continuous wall or may be constructed of a series of connected sides depending on the cross-sectional shape of the arced tube 32. The arced tube 32 is capped at a first end 36 by a cap 56 and a second end 38 by a cap 58. The wall 31 of the arced tube 32 defines an inner space 39 between the two capped ends 36, 38. The inner space 39 contains a liquid 35 in which a bubble of gaseous fluid 33 resides that serves as a slope indicator 34. The slope measuring device 30 also includes a template 40 of measurement indicia 42.

The caps 56, 58 used to seal the liquid 35 in the inner space 39 of the arced tube 32 prevents leakage of the liquid 35 that would cause the bubble 33 to grow in size, thereby lessening the accuracy of the slope measuring device 30. Also, the caps 56, 58 may be useful in preventing or minimizing the changing of the size of the bubble 33 due to temperature or other environmental changes affecting the slope level 10. For example, the caps 56, 58 may be pressure caps that expand and contract as the liquid expands and contracts to allow the air bubble 33 in the liquid 35 to remain generally a constant size. In this manner, temperature changes would have less effect on the slope measuring device 30.

In some embodiments, arced tube 32 may comprise a tube that is sealed at one or both ends. In such embodiments, end caps 56, 58 may not be needed to prevent leakage or address expansion/contraction of the liquid. Instead, end caps 56, 58 may be used to cushion arced tube 32 against motion imparted to the level due to vibration, impact shocks (such as when the level is dropped), and/or other sources of physical stress. Cushioning the arced tube 32 may result in a more durable product. The end caps 56, 58 may comprise rubber, silicone, and/or other suitable materials selected to achieve the cushioning effect. In some embodiments, as will be discussed in further detail below, the end caps may be adapted to properly seat the arced tube 32 in a groove in the body of the slope level. Of course, in other embodiments, the end caps 56, 58 may be configured to provide a cushioning effect as well as sealing one or more ends of arced tube 32.

Between the first end 36 and the second end 38 of the arced tube 32, is a pinnacle point 37 that coincides with the point where a tangential plane T touches an outer edge 41 of the arced tube 32. The tangential plane T runs parallel to a planar measurement surface 20 on the bottom side 16 of the body 11. At the pinnacle point 37, the template 40 has a measurement indicator of "0" pitch, thereby indicating that the surface on which the planar measurement surface 20 resides has no slope when the slope indicator is positioned there. FIG. 3A illustrates the slope level 10 on the surface 29 that has a pitch of zero ("0") meaning the surface 29 has no slope.

The measurement indicia 42 also provide measurement of pitch from 1 to 12 on either side of the pinnacle point. The range of pitch or angle measured by the slope measuring device 30 can vary depending on the end use. In the embodiment shown, the pitch can be measured up to 12, which correlates to an angle of about 45 degrees. The arced tube has a radius of curvature R that is measured from an axis 45 to a center line 44 that runs through the middle of the arced tube 32. The radius of curvature R is uniform across the arced tube 32. The range of angles to be measured by the slope measuring device and fineness of the degree of measurement indicia 42 effects the width of the body 11 as well as the radius of curvature R of the arced tube 32. The larger the radius of curvature R is, the more accurate the measurements of the slope measuring device 30 can be. At the same time, the width W of the body 11 must be taken into consideration to ensure that the width is manageable for easy use of the slope level 10.

Depending on the range of the angles capable of being measured by the slope level 10 and on the level of accuracy that is needed, the radius of curvature R may be larger or smaller, while still providing a width W of the body 11 that provides for easy use of the slope level 10. For example, to provide a measurement for a pitch of up to 12 on either side, a radius of curvature R of about 5 and ⅛ inches may be used on a body 11 having a width of about 2½ inches. Such a width allows for easy use by builders or carpenters who are working on roofs or in other precarious positions.

For measurements of smaller slopes which require a finer degree of accuracy, a larger radius of curvature R may be used that permit the use of measurement indicia at smaller intervals. For example, when leveling tile, a slope level 10 having a smaller range of measurement capabilities that allow for measurements of angles in tenths of degrees or fractions of pitch may be useful. FIG. 3B illustrates the portion of the slope level 10 of FIG. 3A having its planar measurement surface 20 residing against a surface 28 to be measured. The slope indicator 34 in the form of the bubble of gaseous fluid 33 moves along the outer edge 41 of the arced tube 32 as the liquid 35 in the inner space 39 of the arced tube 32 settles. Through use of the template 40 with its measurement indicia 42, the position where the slope indicator 34 comes to reside indicates the angle α (as measured in pitch) at which the surface 28 extends in relation to a horizontal ground axis G. The point along the outer edge 41 of arced tube 32 at which the slope indicator 34 resides corresponds to the point where a tangential plane T1 that runs parallel to the horizontal ground axis G passes through the outer edge 41 of the arced tube 32. Again, this point can be correlated to the angle α at which the surface 28 extends in relation to the horizontal ground axis G. In the embodiment shown in FIG. 3B, the slope indicator 34 indicates that the slope angle α has a pitch of around 5.33, which is around 20 degrees.

Figure 4:
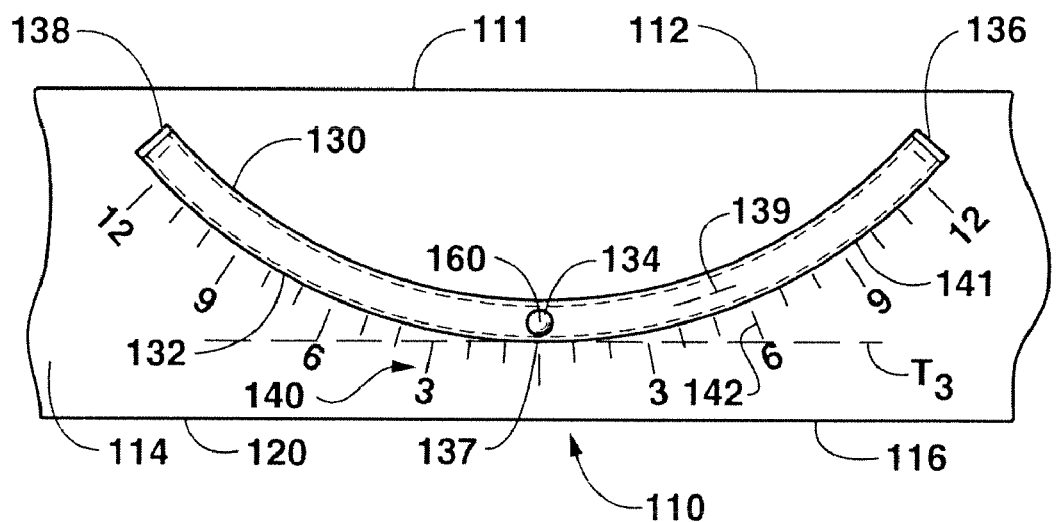
FIG. 4 illustrates a partial front view of a further embodiment of a slope level according to the present subject matter.

FIG. 4 illustrates an exemplary embodiment of a portion of an alternate slope level 110. The slope level 110 has a body 111 having a top side 112 and a bottom side 116 as well as a front face 114 and a back face. The bottom side 116 has a planar measurement surface 120 that may be placed against a surface to be measured.

The slope level 110 also includes a slope measuring device 130. The slope measuring device 130 has an arced tube 132 located on the front face 114 of the body 111 of the slope level 110. The arced tube 132 has a first end 136 and a second end 138. As described above, the arced tube 132 has a pinnacle point 137 located between the first end 136 and the second end 138. The pinnacle point 137 corresponds to a point on the outer edge 141 of the arced tube 132 at which a tangential plane T3 passes that is parallel to the planar measurement surface 120. The arced tube 132 defines an inner space 139 in which a slope indicator 134 resides in the form of a solid spherical bead 160. Preferably, the solid spherical bead 160 may be made out of a metal. For example, the bead may be made from aluminum, stainless steel, titanium, or the like. Alternatively, instead of a spherical bead, a drop of a heavy liquid such as mercury may be used. The arced tube 132 is positioned on the body 111 such that the arced tube 132 is visible from at least one of the front face 114 or the back face. The first and second ends 136 and 138 are further from the planar measurement surface 120 than the pinnacle point 137 such that the arced tube 132 is in an inverse position compared to the arced tube 32 shown in FIGS. 3A and 3B. In some embodiments, the inner space 139 may contain a liquid with the spherical bead 160 being made of a material that has a greater density than the liquid. For example, the liquid may be a mineral oil. In such embodiments, the liquid may reduce rattle and dampen the movement of the bead 160. When liquid is used in the arced tube 132, a small air bubble may be included in the liquid to allow for contraction and expansion of the liquid due to temperature changes depending on the liquid used.

A template 140 having measurement indicia 142 extends along the outer edge 141 of the arced tube 132. Each measurement indicia 142 resides at a point where the spherical bead 160 comes to reside when the planar measurement surface 120 is placed upon a surface having a slope of an angle that corresponds to that specific measurement indicator 142.

The arced tube 132 may have a larger radius of curvature or a smaller radius of curvature. For example, the radius of curvature may be 12 inches or larger in some embodiments. In other embodiments, the radius of curvature may be as small as about an inch. The arced tube 132 has a uniform radius of curvature. When the slope level 110 is placed against the surface to be measured, the point where the slope indicator 134 comes to rest is at a point where a tangential plane passes that is parallel to the horizontal ground axis. Therefore, pinnacle point 137 occurs at a tangential plane parallel to the planar measurement surface 120 and this represents the point where no slope is indicated. For this reason, the measurement indicator 142 located at the pinnacle point 137 represents a pitch of zero ("0").

In the embodiment shown in FIG. 4, gravity works to pull the spherical bead 160 along the outer edge 141 of the arced tube 132 as the body 111 is tilted once the planar measurement surface 120 resides against the surface to be measured. Where the spherical bead 160 comes to reside will directly correlate to the angle of the surface being measured in relationship to a horizontal ground axis.

As above, the length of the slope level is important to the operation of the slope level 110. The length should be great enough to neutralize minor variations of slope on the surface being measured. For example, the length of the body 111 should be long enough to allow the carpenter or builder to use the level 110 on structures having a rough surface. For instance the length may range from about 1 foot to about 5 feet. The depth of the slope level should also be such that the slope level can rest against the surface to be measured without extra support. The depth (see the cross-sectional view of FIG. 6) should be such that the slope level 110 will not tip over when placed on the surface to be measured.

Figure 5:
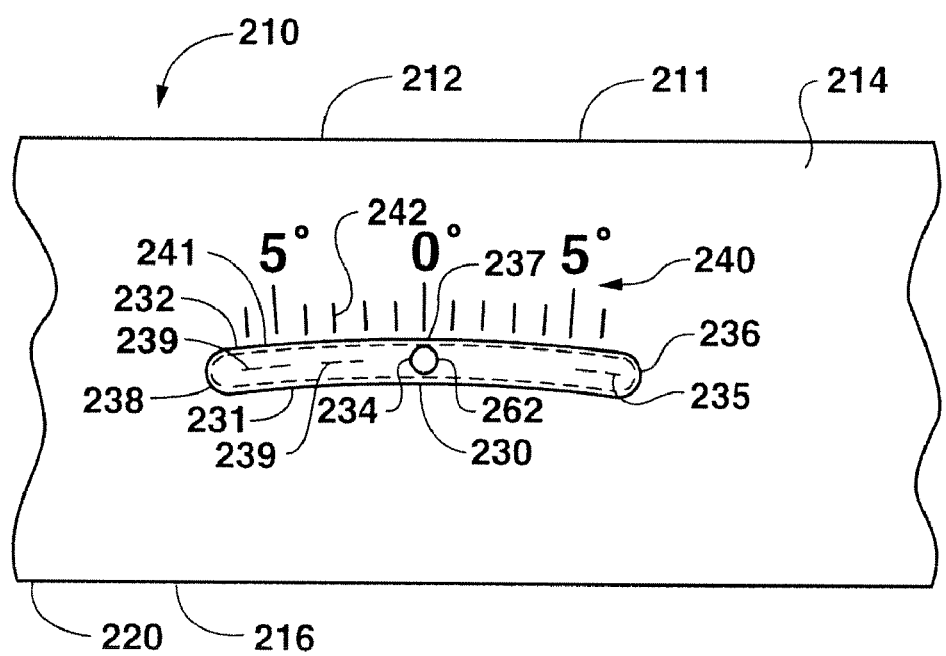
FIG. 5 illustrates a partial front view of another embodiment of a slope level according to the present subject matter.

FIG. 5 illustrates a further exemplary embodiment of a slope level 210. The slope level 210 includes a body 211 having a front face 214 and a back face (not shown) as well as a top side 212 and a bottom side 216. The bottom side 216 has a planar measurement surface 220 that may be placed against a surface to be measured.

A slope level 210 includes a slope measuring device 230 having an arced tube 232 and a template 240 of measurement indicia 242. In the embodiment shown, the measurement indicia 42 indicate the angle of slope in degrees. The arc of the tube 232 has a large radius of curvature and provides an outer edge 241 that allows measurement of only a limited range of slope angles. Since the radius of curvature is larger, the degree of measurement details of the measurement indicia 242 template 240 may increase. For example, angle may be measured to tenths of a degree. In this manner, small changes in grade or slope within the range of slope angles that are capable of being measured can be more accurately determined by such a device.

In the embodiment shown, the arced tube 232 has a wall 231 that defines an inner space 239. The inner space 239 is filled with a liquid 235 and contains a slope indicator 234 that is a hollow bead 262 filled with a gaseous fluid. The hollow bead 262 has a density less than the fluid 235. The arced tube 232 has a first end 236 and a second end 238 and a pinnacle point 237 that corresponds to a point through which a tangential plane passes that is parallel to the planar measurement surface 222. The pinnacle point 237 corresponds to a zero ("0") slope indicated by the "0°" slope measurement indicator 242. As the body 211 and its measurement planar surface 222 is placed against a surface to be measured the hollow, spherical bead 262 moves on the outer edge 241 to a resting position. The resting position correlates to the angle of the slope of the surface that is being measured. The slope angle can be deciphered based on the closest measurement indicator 242 at which the hollow, spherical bead 262 resides.

Figure 6:
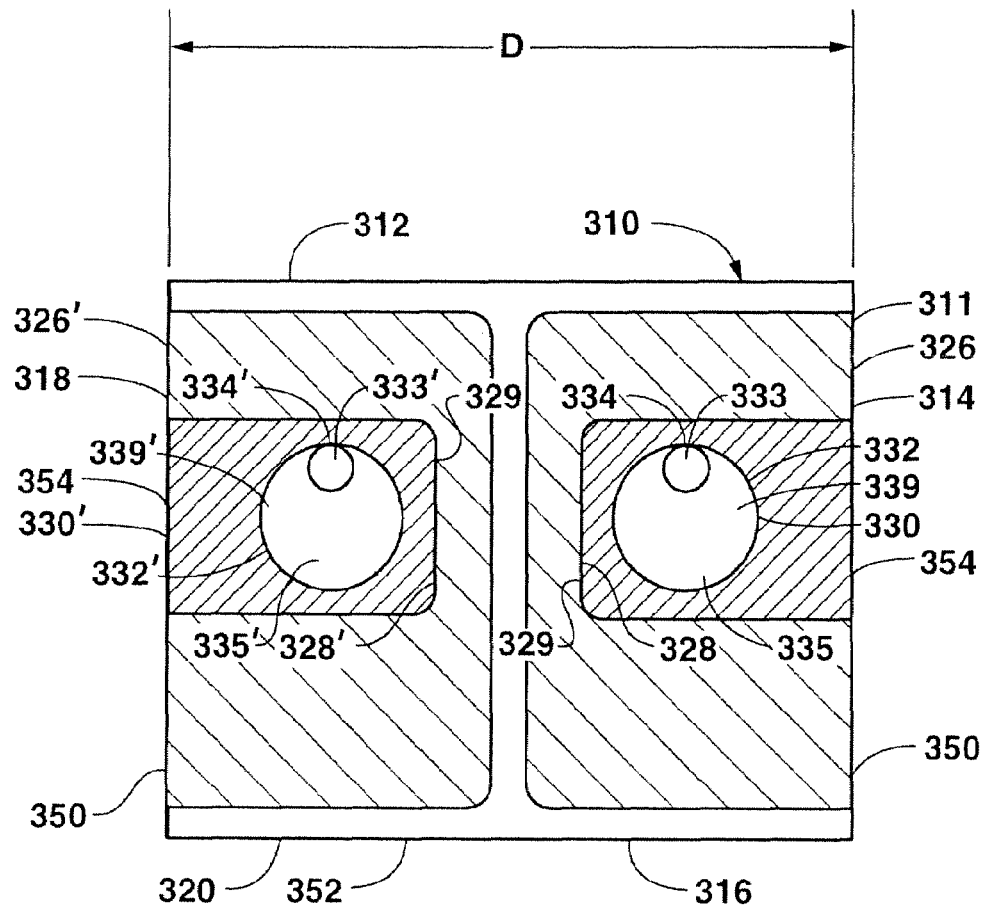
FIG. 6 illustrates a schematic cross-sectional view of another embodiment of a slope level according to the present subject matter.

FIG. 6 illustrates a schematic cross-sectional view of another embodiment of a slope level 310. The slope level 310 includes a body 311. In the shown embodiment, the body 311 is constructed of a metal I-beam 352 forming a base. A filler material 350 fills the voids formed on either side of the I-beam 352 between the I-beam's wings to give the body 311 a generally rectangular cross-section. The filler material 350 may be wood, a composite resin, plastic, or the like. The body 11 has a top side 312 and a bottom side 316. A planar measurement surface 320 is formed on the bottom side 316. The body 311 has a depth D that allows it to easily rest against the surface to be measured without fear of being tipped over. The depth D allows the slope level to stand in its measurement position without extra support. Thus, the user does not have to stand and hold the slope level 310 upright.

The body has a measuring device 330 embedded in a front face 314 and a second measuring device 330' is embedded on a back face 318 of the body 311. Each measuring device 330, 330' includes a transparent arced tube 332, 332' and a template (not shown) as described above. Each arced tube 332, 332' is embedded in a groove 329, 329' cut into the filler material 350. A transparent coating 354 surrounds the arced tubes 332, 332' inside the respective grooves 329, 329'. The coating 354 can be a clear transparent epoxy, an acrylic, or the like. The coating 354 protects the arced tubes 332, 332' from physical abuse and also thermal changes to a certain degree.

Each arced tube 332, 332' defines a respective inner space 339, 339' in which a liquid 335, 335' resides. Within each arced tube 332, 332', a slope indicator 334, 334' that comprises a bubble of gaseous liquid 333, 333' resides within the fluid 335, 335', respectively. In the embodiment shown, the templates (not shown) for each measuring device 330, 330' with their measurement indicia may be marked on the arced tube 332, 332' or on filler material 354. Alternatively, the template of measurement indicia may be on the body 311. For example, the measurement indicia may be marked along outer edges 326, 326', of the respective grooves 329, 329'. In other embodiments, the measurement indicia may be marked along back walls 328, 328' of the respective grooves 329, 329'.

A slope measuring device of the slope level may be in the front face or back face or both the front and back face of the body of the slope level. Alternatively, the slope measuring device may be viewable from both sides by placing a single arced tube in a corresponding aperture in the middle of the body of the slope level. In some embodiments, multiple slope measuring devices may be placed on the same face of the body of the slope level. For example, a first slope measuring device capable of measuring slope angles of up to about 90° may be placed on a front face with a second slope measuring device placed on the same face capable of measuring slope angles of up to about 10°.

The arced tubes that are used in the embodiments described above may be constructed of glass, plastic, or other transparent material. The arced tube can be rigid or may also be flexible. The arced tube may be placed in a groove in the body on either the front face or the back face or both. The portion of the groove behind the arced tube may be shaded or colored to enhance the ability to distinguish and locate the slope indicator. The arced tube may have a circular outer cross-section as well as a circular inner space. In some embodiments, the outer structure may be in the form of a square, while the inner space has a circular cross-section. Further, the arced tube may have a cross-section of other symmetrical shapes as long as the shape does not interfere with the travel of the slope indicator so that the slope indicator can accurately predict the slope of the surface being measured.

As described above, the embodiments in which the arced tube is embedded in the body of the slope level, the area of the body in proximity to the arced tube as well as the arced tube may be covered by a clear coating to protect the arced tube of the slope measuring device. The clear coating can be thick to aid in insulating the arced tube from impacts and temperature changes. At the same time, the clear coating may help magnify the slope measuring device to facilitate the reading of measurements. For example, the coating can be a clear transparent epoxy, an acrylic, or the like. For instance, if a clear epoxy is used, the epoxy serves to protect the arced tube; while at the same time may also help to magnify the slope measuring device so that the position of the slope indicator in the arced tube can be more easily identified.

Figure 7:
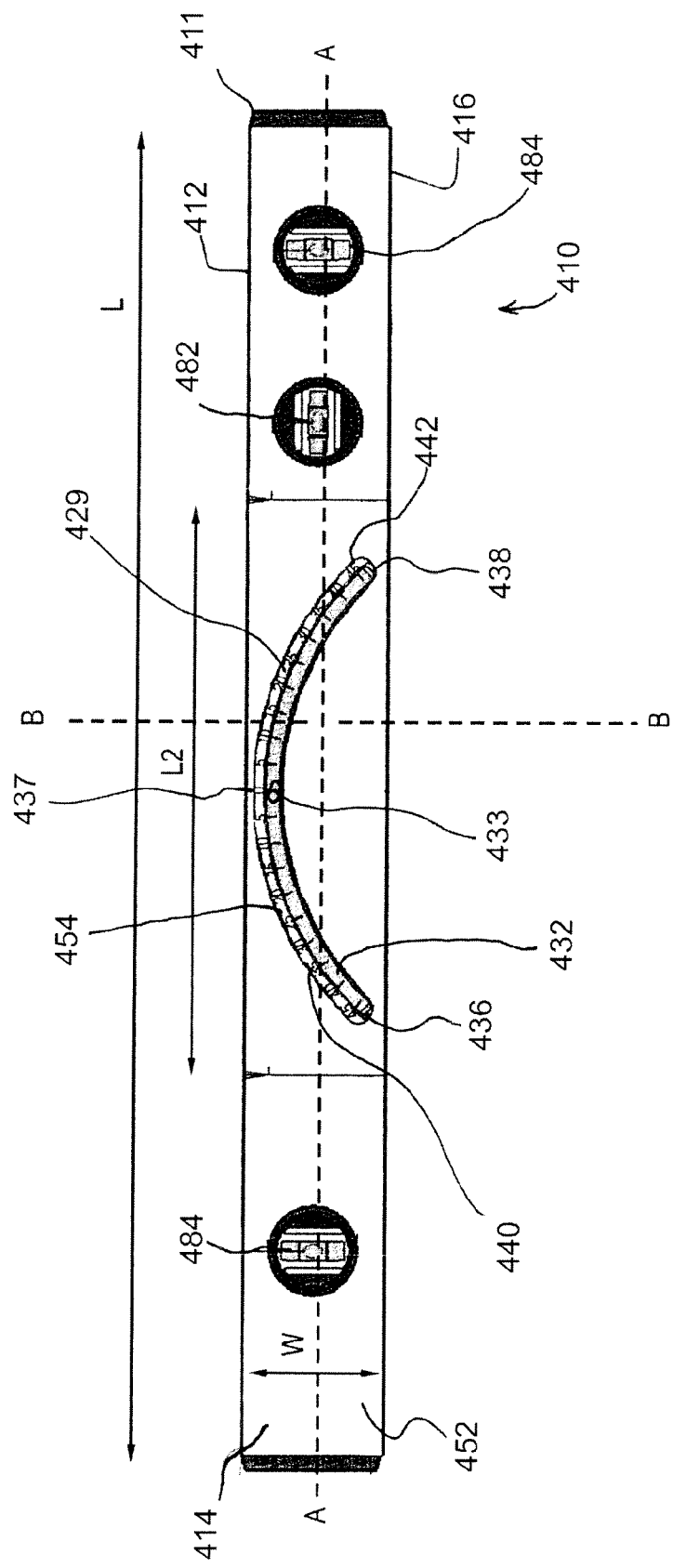
FIG. 7 is a front view of another exemplary embodiment of a slope level.

FIG. 7 is a front view of another exemplary embodiment of a slope level. Exemplary slope level 410 comprises a body 411 which, in this example, comprises a box frame 452 of a generally rectangular shape, one side of which is visible in FIG. 7. For instance, box frame 452 may comprise aluminum. Of course, the boxed frame 452 may comprise other metal(s), plastics, composites, wood(s), and/or other suitable materials. Although a boxed frame is discussed in these examples, the body 411 may comprise other shapes so long as the body is suitably configured to define one or more planar measurement surfaces. Regardless of whether frame 452 comprises a boxed or other construction, the frame may comprise a single unit or may comprise multiple components (e.g. sides) that are brought into alignment and are suitably attached.

The body 411 of slope level 410 has a top side 412 and a bottom side 416, with bottom side 416 defining a planar measurement surface whereby slope can be measured based on the position of bubble 433 within arced tube 432. Level 410 has a length L and a width W and a front face 414 and a back face (not shown in FIG. 7). FIG. 7 further illustrates length L2 corresponding approximately to the portion of level 410 comprising arced tube 432, and dashed lines A-A and B-B, which are included to indicate the views discussed below in FIGS. 8-10. Level 410 further includes conventional horizontal level 482 and vertical levels 484, which may be optionally included to enhance the utility of the slope level. As discussed above, slope levels such as level 410 may be of any suitable length, width, and/or depth (cross-sectional thickness).

In this example, arced tube 432 is positioned in an aperture or groove 429 that corresponds to the arced tube. In these examples, groove 429 extends through the body of the level so that arced tube 432 is visible from both the front side and the back side of level 410 via openings in the front and back sides of frame 452. Of course, in other embodiments, the tube may be visible from only one of the front or back face of level 410. Measurement template 440 comprising measurement indicia 442 is visible at the opening of the body corresponding to groove 429. As discussed below, template 440 is printed on a clear cover 454, which is positioned to protect arced tube 432 at the portions of body 411 where body 411 opens to expose groove 429.

Figure 8:
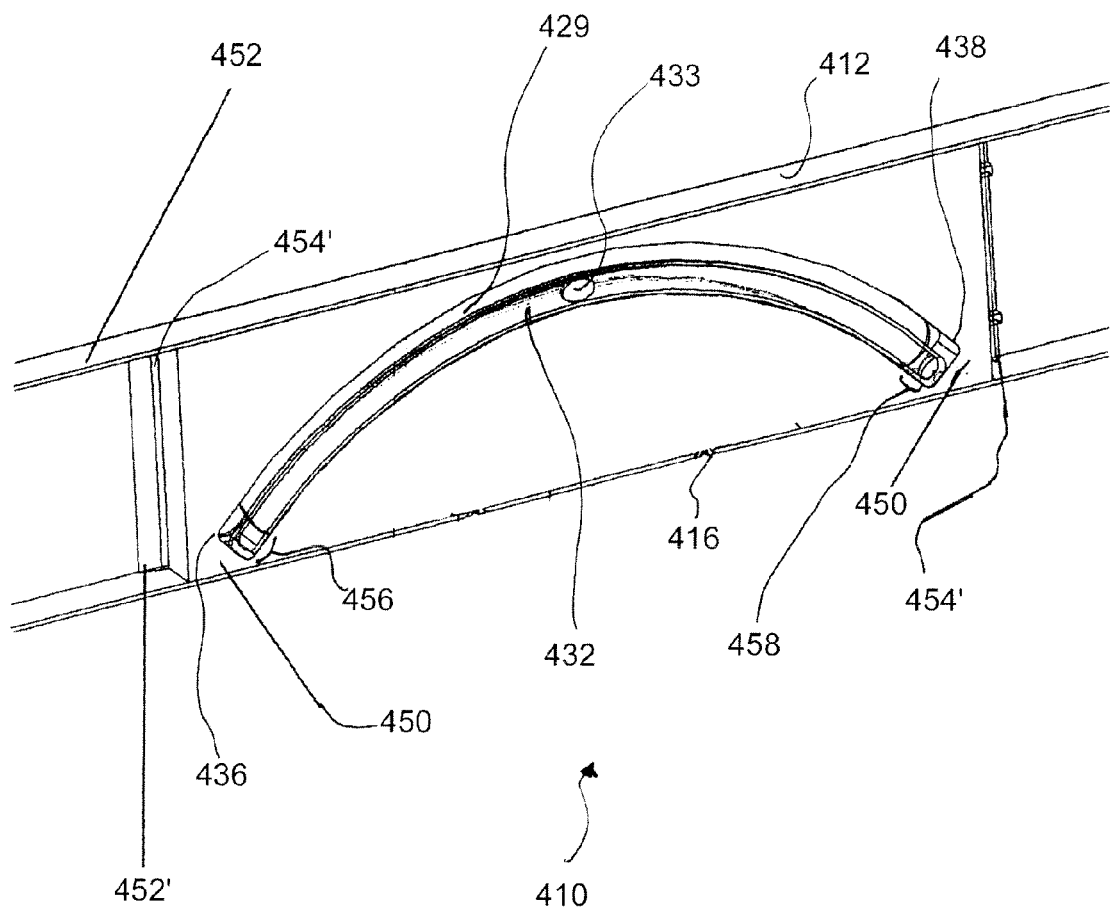
FIG. 8 is a partial side view of the interior of the slope level shown in FIG. 7.

Turning to FIG. 8, a partial side view of the interior of slope level 410 along length L2 as shown in FIG. 7 is illustrated. In this view, the front side of frame 452 and the front portion of clear cover 454 are not illustrated so that interior features of level 410 can be shown in closer detail. A small portion of the rear portion 452' of the frame is shown. Arced tube 432 is shown positioned in groove 429 formed in body 411. Furthermore, body 411 is shown to comprise filler material 450. Filler material 450 may comprise wood, a composite resin, plastic, or the like. Filler material 450 may comprise a solid or substantially solid unit of material(s) as shown in FIG. 8 and/or may include voids as illustrated below in FIGS. 9-10. Filler material 450 may extend the length of the level in some embodiments, and in other embodiments may correspond to the portion of the level where arced tube 432 is positioned. As will be discussed below, rear side clear cover 454' is shown as extending along the rear portion 452' of the frame between the rear side and filler material 450.

In this example, filler material 450 is used to define the interior portion of groove 429 that supports arced tube 432.

For instance, arced tube 432 may be attached or adhered to the top or bottom of groove 429 as defined by filler material 450. In this example, filler material 450 defines a groove 429 that is slightly larger than arced tube 432 such that a gap exists between the top of arced tube and the top of groove 429. It will be understood that the amount of clearance between groove 429 and arced tube 432 may be varied. As shown, filler material 450 is formed so that the side of arced tube 432 is visible through a corresponding opening in the side of frame 452.

Arced tube 432 includes first end 436 and second end 438. First and second ends 436 and 438 may each comprise a respective end cap 456 and 458. For instance, in one embodiment, arced tube 432 comprises a sealed tube and end caps 456 and 458 comprise shock-absorbing material to reduce or minimize mechanical effects on arced tube 432. For instance, end caps 456 and 458 may comprise transparent or substantially transparent materials such as silicone, rubber, or other suitable materials. Filler material 450 and end caps 456/458 may be configured so that the filler material interfaces with a first portion of each end cap, with the other portion of each end cap configured so that the end of arced tube sits in or on the end cap. The end caps 456/458 may be any suitable size, and may extend partially or fully across groove 429 between the front and rear clear covers. The use of cushioning/shock absorbing end caps may be advantageous when a glass tube is used for arced tube 432. Although plastics, composites, and other materials may be used for arced tube 432, in some embodiments, a shaped tube of glass sealed at each end with a suitable liquid and bubble 433 therein may provide for a more accurate reading over a range of conditions. Any suitable type of glass may be used, including, but not limited to, UV-filtering (ultraviolet filtering) glass.

Figure 9:
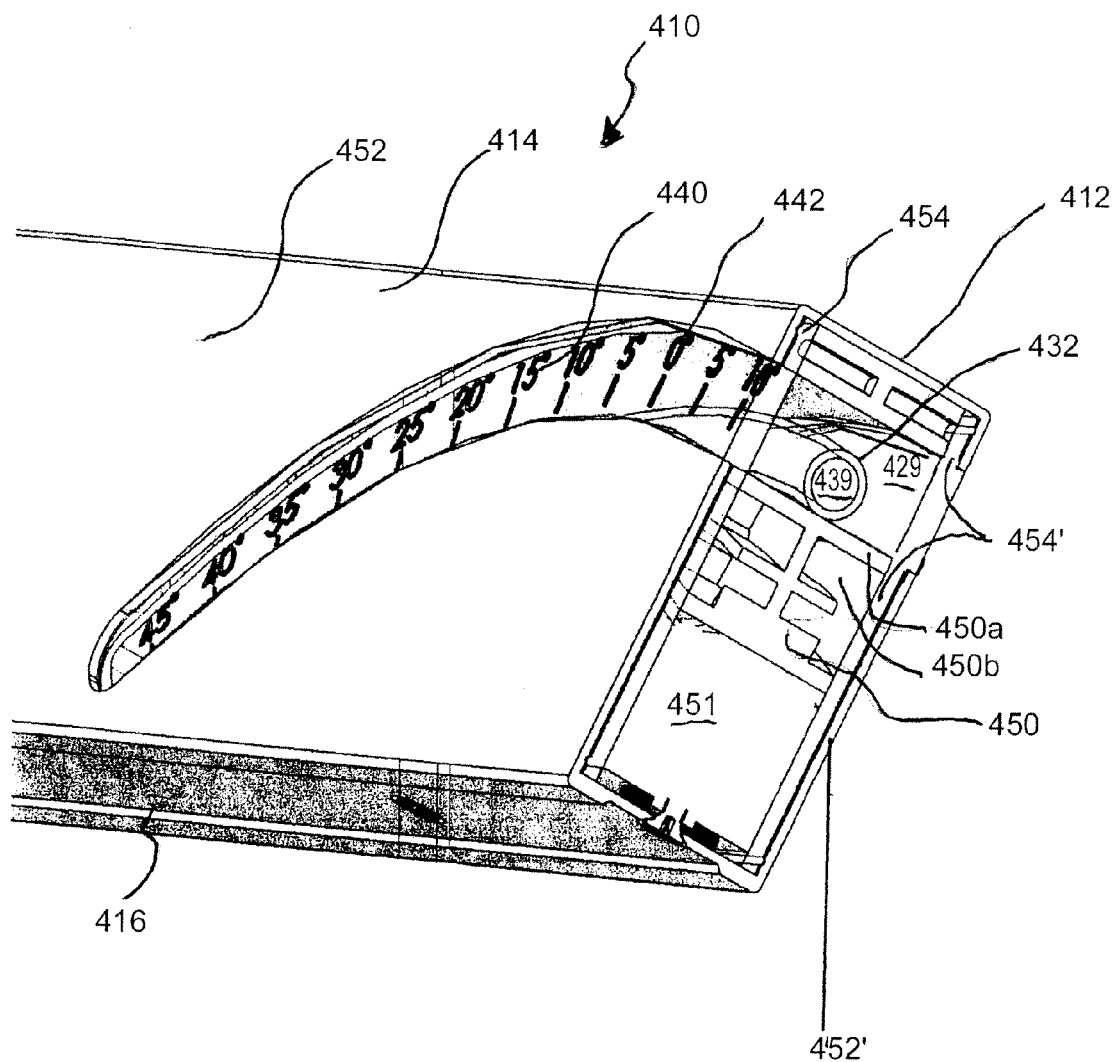
FIG. 9 is a cross-sectional view of the slope level shown in FIG. 7.
Figure 10:
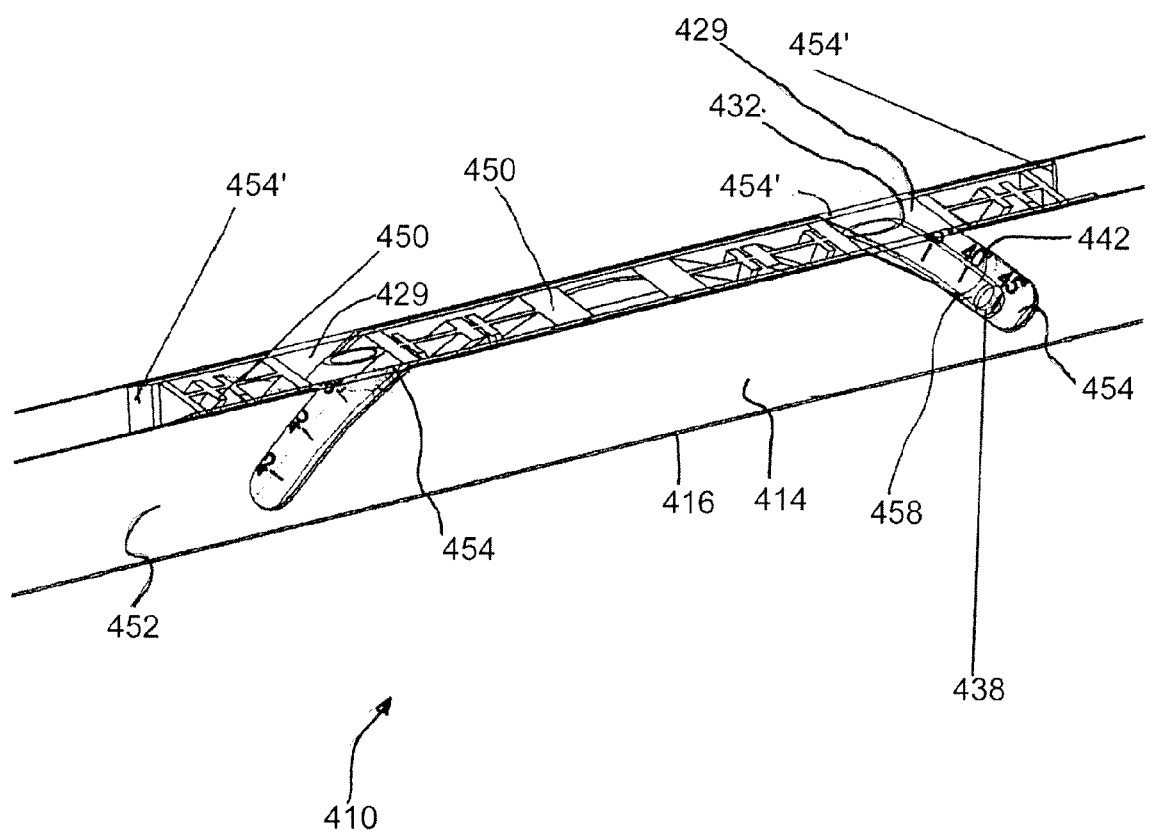
FIG. 10 is another cross-sectional view of the slope level shown in FIG. 7.

FIGS. 9 and 10 are each another view of exemplary slope level 410. FIG. 9 shows a cross-sectional view of slope level 410 taken along line B-B shown in FIG. 7, while FIG. 10 shows a cross-sectional view of slope level 410 taken along line A-A shown in FIG. 7. Additionally, in FIG. 9, the level is shown slightly rotated and in a partial perspective view with bottom side 416 and the front face 414 of the level visible. Visible from the front face 414 of the level are the front side of body 411 as formed by frame 452. Additionally, the openings corresponding to groove/aperture 429 in the front side of body 411/frame 452 and the back side of the frame (452') are shown. This example further shows arced tube 432 as defining inner space 439 which may comprise liquid and a suitable indicator bubble (not shown).

As shown in FIGS. 9-10, in this example, clear cover 454 extends along the side of frame 452 in between the frame and filler material 450. In this example, arced tube 432 is visible from the back side of level 410, as well. For instance, the rear portion 452' of the frame also includes an opening corresponding to groove 429. Back side clear cover 454' extends along the back side of frame 452 between the frame and filler material 450. The position of back side clear cover 454' is also shown in FIG. 8.

Unlike the front and back sides of frame 452 and filler material 450, which each open to form groove 429, clear covers 454 and 454' extend to cover groove 429. Thus, clear covers 454/454' serve to protect arced tube 432 from impacts, dislodging, tampering, etc. that could occur if arced tube 432 were positioned in an open groove in body 411, while still allowing for the arced tube 432 to be viewed. In this example, each clear cover 454/454' comprises a substantially planar piece of material that further comprises a portion that extends outward into a shape corresponding to the shape of the opening in the side of frame 452. Further, in these examples, the outwardly-extending portions extend above the plane by an amount equal or nearly equal to the frame thickness so that, when cover 454 (454') is positioned between the side of body 411 and the filler material 450, the exterior of the clear cover is flush with the side of body 411. However, in other embodiments, clear cover 454 (454') does not necessarily extend outward to be fully flush, or may not extend outward at all.

FIGS. 9-10 further illustrate measurement template 440 comprising a plurality of measurement indicia 442 which, in this example, indicate degrees. As was noted in the embodiments above, the indicia may indicate pitch or any other suitable indicator(s) of slope. The indicia may be formed on or in the portion of clear cover 454 (454') that covers and protects the tube, and may vary between the front and back sides (e.g., the front side may indicate slope in degrees while the back side indicates pitch). In one embodiment, the measurement indicia are formed in the side of the clear cover that faces toward groove 429 (i.e. on the inward side of the cover). The indicia may be printed, embossed, or otherwise formed so as to be visible at the outward side of the cover (i.e. the side of the clear cover that faces away from groove 429).

FIGS. 9-10 additionally illustrate an exemplary cross-sectional view of filler material 450. For instance, filler material 450 may comprise a plurality of voids 450b defined by members 450a formed of plastic, resin, and/or other suitable materials so that the slope level is sturdy but also light. Internal area 451 is represented as empty in FIG. 9. For instance, area 451 may comprise filler material (members and/or voids). Alternatively, in some embodiments, area 451 may comprise space for another vial or tube (arced or conventional).

As was the case with filler material 450, clear cover 454 (454') may extend some or all of the length of the level or may extend only along the portion of the level corresponding to groove/aperture 429. Additionally, the front side clear cover (454) and back side clear cover (454') may be formed as separate units or as a single unitary component positioned between the sides of frame 452 and filler 450. In any event, clear cover 454 may comprise any suitable transparent material, such as a clear plastic or resin.

The use of a gaseous fluid-filled bead in a liquid within the slope measuring device provides an accurate and pinpointed measurement based on where it resides underneath the measuring indicia. Similarly, for a slope indicator of a bubble of gaseous fluid within a liquid, the smaller the bubble the more accurate and pinpointed the measurement can be of the slope of the surface being measured. However, the size of the bubble of gaseous fluid should be such that it merits an easy reading of the slope angle. The gaseous fluid within the bubble may be air, oxygen, fluorine, chlorine, bromine, nitrogen, or hydrogen. Further, the gaseous fluid may be an inert gas such as helium, neon, argon, xenon, radon or the like. By using a bubble of gaseous fluid, the liquid within the arced tube is allowed to expand and contract more readily than if an air-filled bead is used in its place.

The liquid used within the embodiments shown may include water, antifreeze, alcohol, mineral oil, synthetic organic fluids, silicone-based fluids, or the like. One suitable liquid that may be used is Dynalene-HC, manufactured by Dynalene Transfer Fluids in Whitehall, Pa. Dynalene-HC provides useful thermal properties that minimize expansion and contraction. In some embodiments, advantageous results may be obtained through use of a liquid comprising potassium formate. For instance, a solution of potassium formate in water may be used at concentrations between about ten percent (10%) and seventy percent (70%), although greater or lesser concentrations could also be used. The liquid used within the arced tube may also be colored so as to allow for a more distinctive contrast between the gaseous bubble and the fluid. Alternatively, if a bead is used, the bead may be colored, while the liquid may be more transparent.

The embodiments of this invention shown in the drawings and described above are exemplary of numerous embodiments that may be made within the scope of the invention. It is contemplated that numerous other configurations of the level may be used and the materials may be selected from numerous materials and dimensions other than those specifically disclosed. In short, it is the Applicant's intention that the scope of the patent issuing herefrom will be limited only by the scope of the appended claims.

What is claimed:

1. A slope level comprising:
    at least one transparent arced tube, the tube defining an inner space containing a liquid therein and a bubble of gaseous fluid disposed in the inner space within the liquid;
    a frame comprising:
        a top side and a bottom side, the bottom side defining a first planar measurement surface,
        a front face and a back face disposed between the top side and the bottom side, and
        at least one aperture in the frame from at least one of the front face or the back face, the aperture corresponding to the arced tube;
    a fill member positioned between the front face and the back face of the frame, the fill member forming a groove shaped to accommodate the arced tube and to allow for viewing of the arced tube from at least the front face or the back face through the corresponding aperture or apertures in the frame the fill member including filler material comprised of a plurality of voids defined by members; and
    at least one clear cover comprising transparent material positioned between the fill member and a side of frame comprising an aperture;
    wherein the at least one clear cover is configured to extend across the aperture to protect the arced tube;
    wherein the arced tube has a first end and a second end and the arced tube defines a pinnacle point between the first end and the second end;
    wherein the first and second ends of the arced tube are in closer proximity to the first planar measurement surface than the pinnacle point; and
    wherein the arced tube comprises glass that filters UV (ultraviolet) radiation.

2. The level as set forth in claim 1, wherein the frame comprises at least one aperture in the front face and the back face, the apertures corresponding to the arced tube.

3. The level as set forth in claim 1, wherein the at least one clear cover extends outward to fill the aperture so that the exterior of the clear cover is substantially flush with a face of the frame at the aperture.

4. The level as set forth in claim 1, wherein the liquid comprises a potassium salt.

5. The level as set forth in claim 4, wherein the liquid comprises a solution comprising potassium formate.

6. The level as set forth in claim 5, wherein the solution comprises potassium formate and water at a percentage concentration between about ten percent and about seventy percent.

7. The level as set forth in claim 1, wherein the arced tube comprises a sealed glass tube.

8. The level as set forth in claim 1, further comprising an end cap at least one end of the arced tube, wherein each end cap comprises a pliable material configured to cushion the ends of the arced tube.

9. The level as set forth in claim 8, wherein the pliable material is transparent.

10. The level as set forth in claim 8, wherein each end cap comprises silicone.

11. The level as set forth in claim 8, wherein each end cap comprises rubber.

12. The level as set forth in claim 1, further comprising at least one measurement template.

13. The level as set forth in claim 12, wherein the at least one measurement template comprises a plurality of indicia formed on the portion of the clear cover corresponding to an aperture.

14. The level as set forth in claim 13, wherein the plurality of indicia are formed on the side of the clear cover facing the arced tube.

* * * * *